Sept. 16, 1952     M. A. MARKEL ET AL     2,610,820
VALVE BONNET STRUCTURE
Filed Nov. 15, 1946     2 SHEETS—SHEET 1
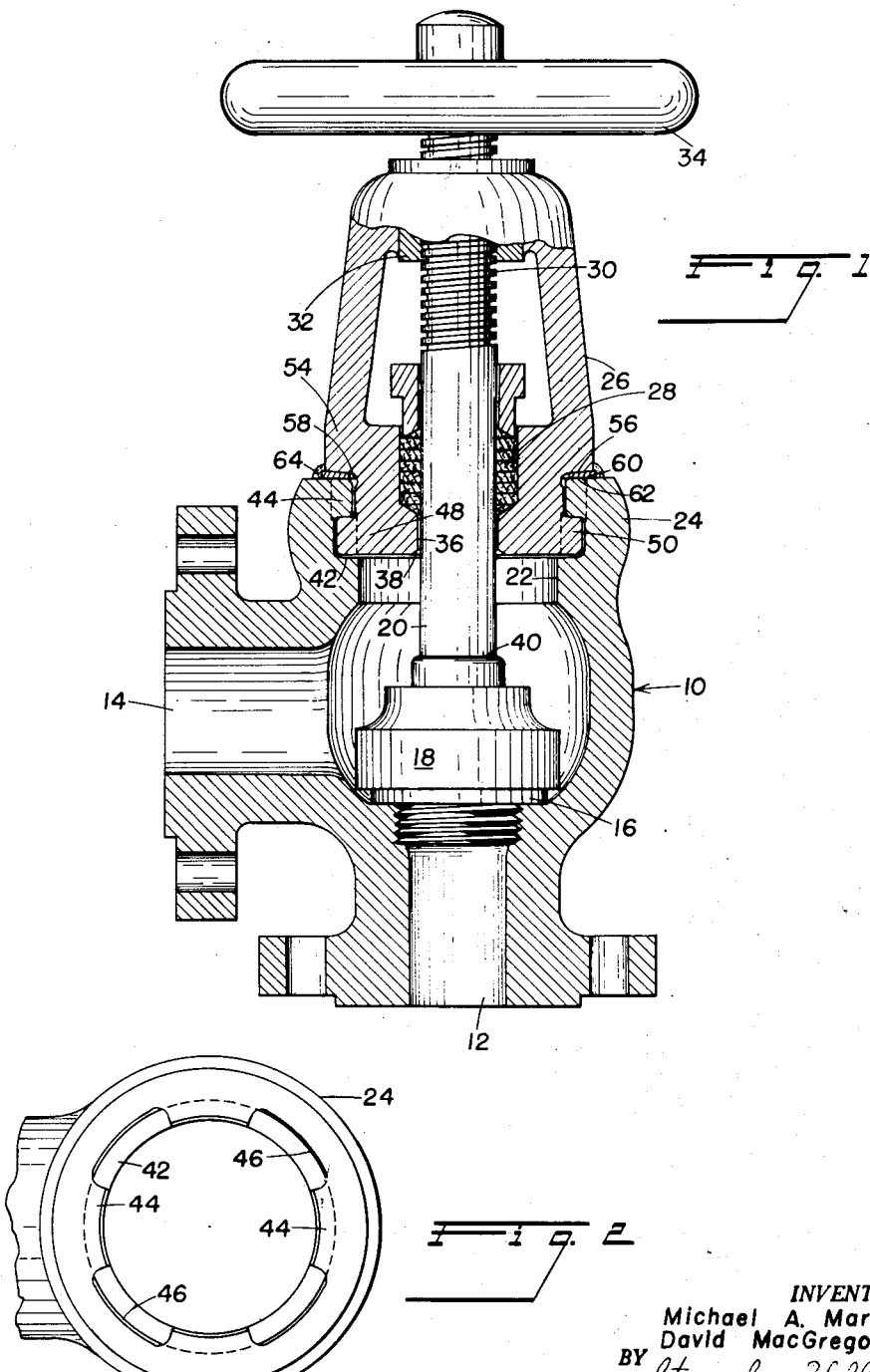
INVENTORS
Michael A. Markel
David MacGregor
BY *Strauch & Hoffman*
attorneys Sept. 16, 1952 M. A. MARKEL ET AL 2,610,820
VALVE BONNET STRUCTURE
Filed Nov. 15, 1946 2 SHEETS—SHEET 2
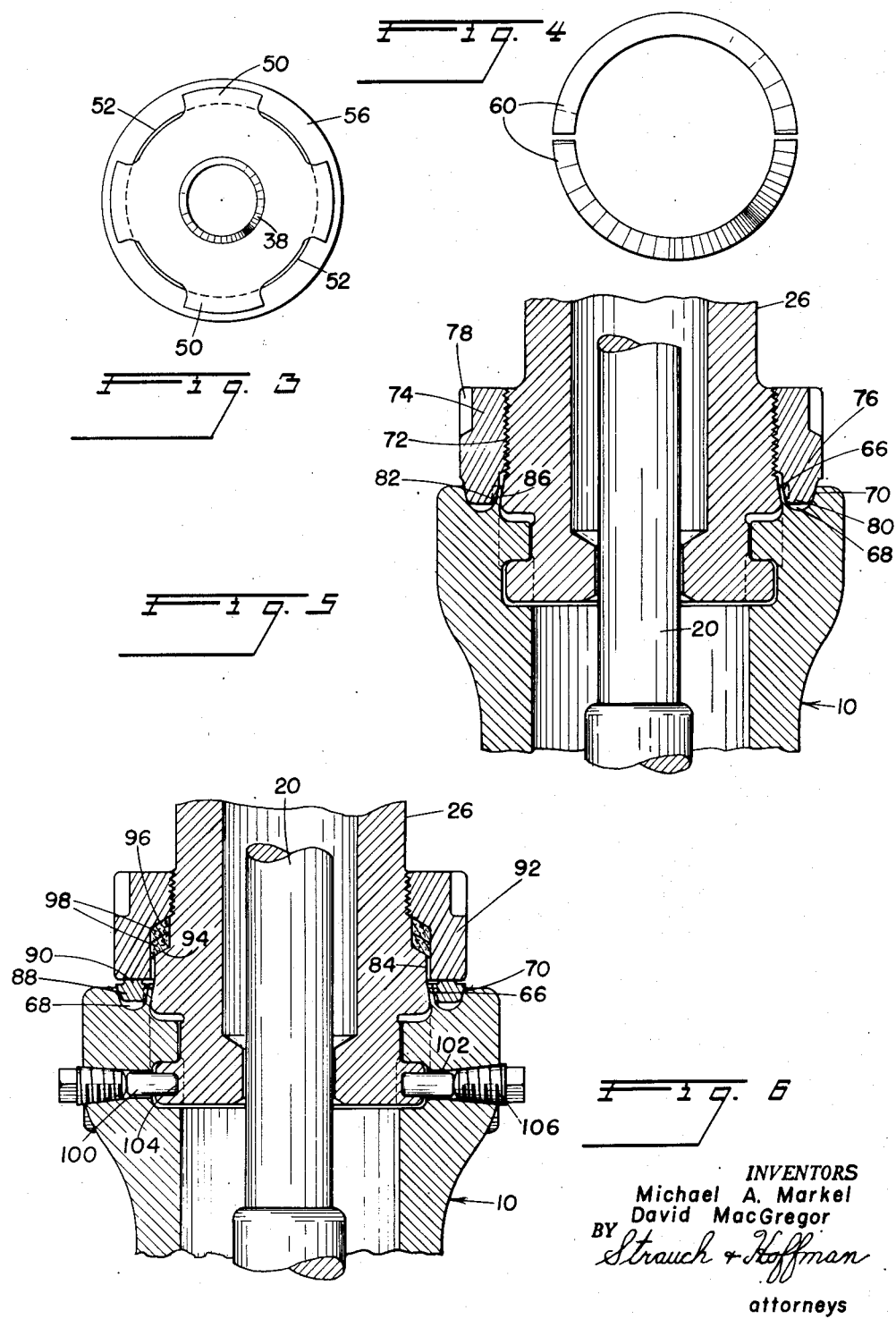
INVENTORS
Michael A. Markel
David MacGregor
BY Strauch & Hoffman
attorneys Patented Sept. 16, 1952

2,610,820

UNITED STATES PATENT OFFICE 2,610,820

VALVE BONNET STRUCTURE

Michael A. Markel, East Chicago, and David MacGregor, Munster, Ind., assignors to Edward Valves Incorporated, East Chicago, Ind., a corporation of Indiana Application November 15, 1946, Serial No. 710,152

15 Claims. (Cl. 251—49)

This invention relates to valves and more particularly to a valve of the heavy duty, high-pressure type, in which a valve stem supporting bonnet is connected to the valve body.

Heretofore, considerable difficulty has been experienced in obtaining an accurately centered or aligned relation of the bonnet with the valve stem bore in the valve body with an effective seal of the assembly against external leakage of fluid pressure. It is the general object and purpose of the present invention to provide a simple solution of this problem, embodying a minimum number of parts of novel construction, which may be expeditiously assembled in final cooperative relation to provide a rigid fluid-tight connection between the valve body and the bonnet.

Another object of the invention resides in the provision of coacting, interlocking lugs on the valve body and bonnet which take the internal pressure load and prevent axial displacement of the bonnet relative to the valve body.

A further object, in one embodiment of the invention, is to provide wedge means insertable between opposed surfaces of the bonnet and valve body to rigidly hold the bonnet against angular displacement and insure equal pressure-loading of the interlocking lugs. Preferably, the wedge means is retained in applied position by means of a weld which also serves to effectively prevent external leakage of the fluid pressure.

In another embodiment of the invention, it is an additional object to provide means for deforming an internal annular lip on the valve body into sustained pressure contact with an annular tapered surface on the bonnet to accurately align the bonnet and valve body and at the same time establish a substantial seal against leakage of fluid pressure.

It is also an object of the invention to provide simple means for restraining the bonnet against turning movement relative to the valve body under heavy torque stress.

It is also the aim of the present invention to provide a valve having one or more of the above characterized novel features, in which the several cooperating elements are of rugged and durable construction, and which may be produced at reasonably low cost.

With the above and other subordinate objects in view, the invention resides in the improved valve and in the construction and relative arrangement of its several parts, as will hereinafter be more fully described, illustrated in the accompanying drawings, and subsequently incorporated in the subjoined claims.

In the drawings, wherein we have disclosed several simple and practical embodiments of the invention, and in which similar reference characters designate corresponding parts throughout the several views:

Figure 1 is a vertical sectional view of a valve assembly of the bonnet type;

Figure 2 is a top plan view of the valve body;

Figure 3 is a bottom plan view of the bonnet;

Figure 4 is a plan view of the two-part wedge;

Figure 5 is a fragmentary vertical section illustrating a modified form of the invention; and Figure 6 is a similar view showing a further modification.

With continued detail reference to the drawings, and for the present more particularly to Figures 1 to 4 thereof, we have shown a valve body 10 of more or less conventional external form, having a fluid inlet passage 12 and an outlet passage 14. Between the fluid passages, the valve body is internally provided with a suitable valve seat which may be either an integral part of the valve body, or in the form of a separate valve seat member, as indicated at 16. The valve member 18 has a swivelled or rotatable connection with the lower end of the valve stem 20 which extends upwardly through the bore 22 of a vertical extension 24 of the valve body.

The valve stem 20 is supported in the bonnet 26 which is connected to the extension 24 of the valve body in the manner to be presently explained. The valve stem extends through the customary stuffing box 28 in the bonnet 26 and has its threaded upper end portion 30 engaged in an internally threaded bushing 32 suitably fixed in the bonnet 26. To the valve stem externally of the bonnet, a hand-wheel 34 of conventional form is secured.

Below the stuffing box 28, the valve stem 20 is in clearance relation to an opening 36 in the bonnet, at the lower end of which a tapered or flaring seat 38 is formed with which the shoulder 40 on the valve stem may be tightly engaged in the open position of the valve to prevent the flow of any appreciable amount of fluid through said opening and around the valve stem, in repacking the stuffing box 28.

The extension 24 of the valve body at its upper end is of increased wall thickness and in suitably spaced relation from the upper end surface thereof is formed with an internal annular horizontal shoulder 42. Above the shoulder 42, the valve body is further provided with a plurality of locking lugs 44 of arcuate form and intervening recesses 46. The lugs 44 terminate at their lower ends in vertically spaced relation from the shoulder 42 and the inner arcuate edges of these lugs are of approximately the same diameter as the diameter of the bore 22. In the present instance, we have shown four of the lugs 44 equidistantly spaced apart 90 degrees, though it will be understood that a greater or lesser number of lugs may be employed.

The bonnet 26 is formed with a lower end section 48 of somewhat less external diameter than the diameter of the bore 22 and upon the lower end of this bonnet section 48, arcuate lugs 50 are integrally formed and project radially outward therefrom. These lugs and the recesses 52 therebetween correspond in number to the lugs 44 and recesses 46 of the valve body. The lugs 44 and 50 are of substantially equal circumferential length, which is somewhat less than the circumferential length of the recesses 46 and 52. At the upper end of section 48, the bonnet 26 is formed with a large diameter section 54 having a lower inwardly and downwardly inclined annular face 56 connected with the outer diameter of bonnet section 48 by a fillet groove 58 and vertically spaced for a predetermined distance above the lugs 50.

As thus far described, the valve and supporting bonnet 26 are assembled on the valve body by positioning said bonnet so that the lugs 50 thereof will pass downwardly through the recesses 46 of the valve body and rest upon the horizontal shoulder 42. The relative vertical dimensions of the lugs 44 and 50 are such that in this position of the bonnet the opposed end faces of said lugs are in clearance relation so that the bonnet may be turned on the shoulder 42 to position the lugs 50 thereof beneath and in vertical alignment with the lugs 44 on the valve body. While the bonnet is held against rotation, the valve stem is now rotated and under continuous forcing pressure of valve member 18 against the seat 16, the bonnet 26 is moved vertically upward to establish a solid contact between the lugs 50 thereon and the lugs 48 on the valve body.

In this interlocked relation of the lugs on the bonnet and the valve body, the inclined annular surface 56 on the bonnet is vertically spaced above the horizontal surface 62 of the valve body extension 24. In this space, the two transversely wedge-shaped ring members 60 are now inserted, the lower face of each ring member being disposed in a horizontal plane for contact with surface 62 on the valve body, while the upper face thereof is inwardly and downwardly inclined for contact with surface 56 on the bonnet. These rings are tapped into position by means of a suitable tool to obtain positive engagement of the ring sections with the surfaces 56 and 62 which coact therewith to finally adjust and position the bonnet in concentric relation with the bore 22 of the valve body and insure uniform spacing of the lugs 50 on the bonnet above the shoulder 42 on the valve body. Thus even distribution of the internal fluid pressure loading on the interlocking lugs, when the valve is open, is insured. In this manner, substantially perfect alignment between the valve body and the valve stem and its supporting bonnet is obtained. Preferably, the wedge members 60 are seal-welded to the valve body and bonnet as shown at 64. This continuous annular weld, also effectively precludes external leakage of high pressure fluid from the valve.

In Figure 5 of the drawings, we have shown a modified form of the invention, in which the valve body and bonnet are provided with the coacting interlocking lugs as above described. In this instance, however, the valve body is extended vertically above the internal lugs thereon and at the outer side of said lugs is formed with an upstanding annular lip 66. This lip is circumscribed by an annular channel or groove 68 of appreciable depth, the external face of the lip 66 forming the inner side wall of said groove while the outer side wall thereof diverges upwardly and outwardly as indicated at 70. Normally, the inner and outer side faces of the annular lip 66 extend in approximately parallel relation to the wall of the bore in the valve body. Above the groove 68 at the outer side thereof the wall of the valve bonnet is externally threaded as at 72 to receive an internally threaded retainer ring 74. One end of this ring is provided in its peripheral face with suitably spaced recesses 78 to receive the lugs of a spanner wrench. At its other end and extending beyond the threaded section thereof, the ring 74 terminates in a tapered annulus 80, the inner and outer inclined side faces of which merge into the end face of said annulus on large radius arcs 82.

Above the interlocking lugs on the bonnet, this bonnet is formed with an enlarged diameter section 84 having an annular peripheral face 86 tapered or inclined outwardly and downwardly to the lower end of said section 84 at an angle of approximately two degrees.

In assembly of the construction above described, the lower end of the valve bonnet is inserted into the upper end of the valve body and interlocked therewith in the manner previously explained. The tapering surface 86 on the bonnet is in clearance relation to the inner face of the lip 66 and extends upwardly in divergent relation thereto. The retainer ring 74 is formed of comparatively hard metal, such as hardened stainless steel, and when said ring is threaded downwardly on the bonnet into the upper end of the valve body, the tapered terminal annulus 80 thereof enters the groove 68. Initially the inner rounded corner edge 82 of this annulus engages the outer edge of the lip 66. In the continuous downward threading movement of the ring 74, the inner tapering face of the annulus 80 exerts a wedging action on the annular lip 66 and uniformly deforms said lip, forcing the same inwardly into tight sealing pressure contact with the tapered peripheral surface 86 of the bonnet. The bonnet will in this manner be accurately aligned or centered with respect to the valve body and angular or axial movement of said bonnet with respect to the valve body effectively prevented. At the same time, it will be apparent, that owing to the threaded connection of ring 74 with the bonnet 26, as the lip 66 is distorted the bonnet is vertically lifted to insure tight face to face contact between the interlocking lugs on the bonnet and valve body and obviate any tendency of the bonnet to drop downwardly and reduce the effectiveness of the pressure seal between the bonnet and the annular lip 66.

In Figure 6 of the drawings an alternative of the construction last described is illustrated. In this embodiment, the wedging annulus 88 for deforming the lip 66 is a separate element, instead of being integral with the ring 74. It is of substantially the same cross-sectional form as the annulus 80, excepting that the annulus 88 is provided with a flat upper surface, upon which is formed a relatively narrow upstanding rib 90 which is contacted by the flat lower end surface of the retainer ring 92. By making the hardened metal annulus as a separate element, a somewhat less expensive construction is provided, and this element when unduly worn can be readily replaced at nominal cost. Otherwise, the construction and functional operation of this embodiment is the same as that of Figure 5.

As an additional precautionary measure against leakage, we may provide the section 84 of the bonnet with an outwardly and downwardly inclined shoulder 94 at its upper end and also form on the flange of the retainer ring 92 at its inner side a similar shoulder 96, between which suitable packing rings 98 are compressed as the ring 92 is adjusted to deform the annular lip 66. Also, in certain instances, it may be desirable to provide means for positively locking the valve bonnet against turning movement under heavy torque stress. In the present instance, we have shown such means as comprising one or more dowel pins 100 which are axially movable in transverse bores 102 radially centered below one or more of the lugs 44 on the valve body and adapted for engagement at their inner ends in registering cylindrical recesses 104 formed in the lugs 50 on the bonnet. The bore 102 has a tapered threaded outer end section to receive a tapered threaded plug 106 bearing against the outer end of dowel pin 100 to removably retain the same in applied position.

In the constructions of Figures 5 and 6, the bonnet may be readily removed from its assembled position on the valve body. This is accomplished by first removing the dowel pin or pins 100, if used, and then partially unthreading the retainer ring to release the deforming pressure on the annular lip 66. The bonnet is then turned to position the lugs thereon in alignment with the spaces between the lugs on the valve body. With the valve in closed position, the valve stem is now rotated to cause a downward thrust pressure of the valve against its seat, thereby lifting the valve bonnet vertically upward relative to the body so that the annular inclined surface 86 on the bonnet will expand the annular lip 66 outwardly substantially to its original position. The bonnet and ring 74, together with the valve and valve stem may then be removed from the valve body.

From the above it is believed that the several disclosed embodiments of our invention will be clearly understood. It will be seen that in each case means is provided for easily and quickly effecting an interlocked connection between the bonnet and valve body together with means for accurately centering the bonnet in aligned relation with said valve body and rigidly holding the bonnet against angular displacement from such aligned position so that uniformly distributed internal fluid pressure loading of the interlocking connection is obtained. Also means is provided to retain said latter means in effective position and in cooperation therewith, seal the bonnet connection against external leakage of the pressure fluid. The several bonnet connections heretofore described are readily adaptable to valves of many different types, the particular valve shown in Figure 1 of the drawings being selected merely for the purpose of illustrating one practical application of our invention. It will further be appreciated that our invention comprises a comparatively small number of cooperating parts of simple and durable structural form so that the production cost thereof will not materially exceed that of valves of this type now commonly known to the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a valve body having an extension provided with a valve stem receiving bore, a stem supporting bonnet, said bonnet and extension having coacting means for releasably interlocking said bonnet with the extension internally thereof, and means for rigidly holding said bonnet in accurately aligned relation with the bore of said extension, comprising an annular lip on said extension and means cooperatively assembled between the valve body and bonnet to simultaneously axially lift said bonnet to tighten the interlock and displace said lip from normal position and maintain sustained uniform pressure contact thereof with an annular surface on the bonnet.

2. The combination defined in claim 1, wherein said last named means comprises an annulus of relatively hard metal mounted in the valve body extension, and means on said bonnet for axially adjusting said annulus in contact with the outer side of said lip to apply a uniform inward wedging pressure thereto.

3. The combination defined in claim 1, wherein said annular surface on the bonnet is downwardly and outwardly inclined toward the base of said lip, and the pressure contact of the lip with said surface is effective to maintain a substantially fluid-tight seal between the valve body extension and said bonnet.

4. The combination defined in claim 1, wherein the valve body extension is provided with an annular groove at the outer side of said annular lip, and said last named means comprises an annulus of relatively hard metal movable in said groove in wedging contact with the outer side of said annular lip, and a retainer ring threaded on said bonnet in adjustable bearing contact upon said annulus.

5. In combination with a valve body having an extension provided with a valve stem receiving bore, a stem supporting bonnet, and means for assembling said bonnet in accurately aligned relation with the bore of said extension, including an annular integral upstanding lip internally formed on the wall of said valve body extension, an annular outwardly and downwardly inclined external surface on said bonnet adapted to be positioned within said lip, and means cooperatively assembled between the valve body and bonnet to simultaneously axially lift said bonnet to tighten the interlock and maintain a sustained uniform inward pressure against the outer side of said lip to radially displace said lip from normal position into substantially fluid sealing contact with said inclined surface on said bonnet and rigidly hold the bonnet in concentric aligned relation to the valve stem bore of said extension.

6. The combination defined in claim 5, wherein said last named means comprises a retainer ring adjustably threaded on the valve bonnet above said lip, and means for exerting a wedging pressure force against said lip actuated by said ring.

7. The combination defined in claim 5, wherein said last named means comprises a retainer ring adjustably threaded on the valve bonnet above said lip, and means for exerting a wedging pressure force against said lip actuated by said ring, together with a compressible packing seal interposed between the retainer ring and bonnet above said wedging means.

8. In combination with a valve body having a valve stem receiving bore, a stem supporting bonnet, coacting lugs on said body and bonnet releasably interlocking the bonnet with the valve body internally thereof, an internal annular sealing lip on the valve body, and manually adjustable means operable to distort said lip from normal position into fluid sealing contact with an annular surface on the bonnet and simultaneously axially lift said bonnet to establish tight face to face contact between the interlocking lugs on the valve body and bonnet.

9. The combination defined in claim 8 wherein said adjustable means includes a retainer ring threaded on the valve bonnet.

10. The combination defined in claim 8 in which the valve body is provided with an annular groove at the outer side of said lip and wherein said adjustable means comprises a retainer ring threaded on the bonnet and a lip-distorting part operable by said ring into bearing contact with the walls of said groove.

11. In combination with a valve body, a valve stem supporting bonnet, a valve in said body having a valve stem projecting into said bonnet, mechanical interlocking means on said bonnet and body internally of said body, and spacer means tightly interposed between cooperating angularly related external surfaces on said bonnet and body adapted to maintain interlocking forces between the body and bonnet in a direction axially of said valve stem and to hold said body and bonnet against relative movement.

12. In combination with a valve body, a valve stem supporting bonnet, means integral with said valve body and bonnet for interlocking the bonnet in assembled relation internally of the valve body, and wedge means interposed between a radially inclined surface on the bonnet and an opposed surface on the valve body and radially movable toward the valve axis to force said surfaces apart to tighten the interlock and rigidly hold said bonnet against angular movement and in axially aligned relation with the valve stem bore of the valve body, whereby internal fluid pressure loading of said interlocking means is evenly distributed.

13. In combination with a valve body, a valve stem supporting bonnet, means integral with said valve body and bonnet for interlocking the bonnet in assembled relation internally of the valve body, and a pair of semi-circular wedge members interposed between an end surface on the valve body normal to the axis of the valve stem bore and an opposed annular surface on the bonnet inclined inwardly and downwardly toward said axis to tighten the interlock and rigidly hold said bonnet against angular movement and in axially aligned relation with the valve stem bore of the valve body, whereby internal fluid pressure loading of said interlocking means is evenly distributed.

14. The combination defined in claim 13, together with a fluid sealing weld circumscribing said wedge members and uniting the same to said valve body and bonnet.

15. In a valve, a valve body, a valve in said body having a threaded stem, a bonnet on said body having threaded engagement with said stem, means to secure said bonnet on said body comprising interlocking abutment surfaces on said body and said bonnet to limit movement of the bonnet outwardly from the body, and a wedge connection between said body and a continuous external surface on said bonnet inclined with respect to the valve axis, said wedge connection including a part radially movable toward the valve axis to force said abutment surfaces into tight engagement.

MICHAEL A. MARKEL.
DAVID MacGREGOR.

REFERENCES CITED

The following references are of record in the file of this patent:

UNITED STATES PATENTS

| Number | Name | Date |
| --- | --- | --- |
| 175,902 | Baker | Apr. 11, 1876 |
| 398,838 | Machin | Mar. 5, 1889 |
| 712,929 | Hedstrom | Nov. 4, 1902 |
| 1,195,686 | Kelly | Aug. 22, 1916 |

FOREIGN PATENTS

| Number | Country | Date |
| --- | --- | --- |
| 26,208 | Great Britain | of 1898 |
| 327,289 | Italy | of 1935 |